United States Patent
Pellegrino

(10) Patent No.: US 7,683,510 B2
(45) Date of Patent: Mar. 23, 2010

(54) SYSTEM AND METHOD FOR MANAGING AIR FLOW IN A MOTOR

(75) Inventor: Brian Pellegrino, Cincinnati, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 489 days.

(21) Appl. No.: 11/224,899

(22) Filed: Sep. 13, 2005

(65) Prior Publication Data

US 2006/0055254 A1    Mar. 16, 2006

Related U.S. Application Data

(60) Provisional application No. 60/609,446, filed on Sep. 13, 2004.

(51) Int. Cl.
*H02K 9/00* (2006.01)
(52) U.S. Cl. ............................................ 310/58; 310/61
(58) Field of Classification Search .................. 310/52, 310/58, 59, 61, 125, 211, 270
See application file for complete search history.

(56) References Cited

U.S. PATENT DOCUMENTS

| | | | | |
|---|---|---|---|---|
| 1,823,337 | A | * | 9/1931 | Sheely ..................... 310/212 |
| 3,010,038 | A | * | 11/1961 | Manni ...................... 310/64 |
| 3,670,238 | A | * | 6/1972 | Ronk ....................... 363/150 |
| 3,832,583 | A | * | 8/1974 | Chang ...................... 310/201 |
| 4,286,183 | A | * | 8/1981 | Montgomery ............... 310/62 |
| 4,488,077 | A | * | 12/1984 | Kova/cs ..................... 310/212 |
| 5,674,057 | A | * | 10/1997 | Guardiani et al. .......... 417/423.3 |
| 5,789,833 | A | * | 8/1998 | Kinoshita et al. ............. 310/64 |
| 5,925,960 | A | * | 7/1999 | Hayes ......................... 310/211 |
| 6,774,514 | B2 | * | 8/2004 | Matsuoka et al. ............. 310/58 |
| 2002/0140307 | A1 | * | 10/2002 | Yanashima et al. ...... 310/154.28 |
| 2006/0226717 | A1 | * | 10/2006 | Nagayama et al. ............ 310/58 |

FOREIGN PATENT DOCUMENTS

| | | | |
|---|---|---|---|
| GB | 2239128 | | 6/1991 |
| JP | 56062052 | A * | 5/1981 |
| JP | 05236690 | | 9/1993 |
| JP | 2001-045725 | * | 2/2001 |
| JP | 2001045725 | | 2/2001 |
| JP | 2001045725 | A * | 2/2001 |
| JP | 2003189545 | | 7/2003 |
| JP | 2003189545 | A * | 7/2003 |

OTHER PUBLICATIONS

Translation of JP 2001045725 A, Jan. 16, 2001, Osamu Yojosawa et al. "Rotor Structure of Electric Rotating Machine".*
US English translation of Yokosawa (JP- 2001-045725), Rotor Structure of a Dynamo-Electric Machine, All, 2001.*
PCT International Search Report—mailed Jan. 23, 2006.
PCT Written Opinion.

* cited by examiner

*Primary Examiner*—Quyen Leung
*Assistant Examiner*—Naishadh N Desai
(74) *Attorney, Agent, or Firm*—Michael J. Wallace, Jr.

(57) ABSTRACT

Certain exemplary embodiments can comprise a system for managing air flow within an induction motor, such as in the rotor assembly of the motor. The system can comprise a gap blocker to substantially impede air flow through radial apertures defined by and/or near end regions of the rotor conductor bars.

24 Claims, 9 Drawing Sheets

SYSTEM AND METHOD FOR MANAGING AIR FLOW IN A MOTOR

CROSS-REFERENCES TO RELATED APPLICATIONS

This application claims priority to, and incorporates by reference herein in its entirety, pending U.S. Provisional Patent Application Ser. No. 60/609,446, filed 13 Sep. 2004.

BACKGROUND

Certain tasks in certain processes in manufacturing an electric motor can require physical space to complete the task. For example, in a manufacturing process for an AC induction motor, when fabricating the rotor assembly, at each end of the rotor's conductor bars, a gap can be required between the corresponding securement ring, which can hold the laminations in place, and the corresponding end ring to successfully connect that end ring to the conductor bar ends.

During operation of the motor, it can be desired that air flow axially through the rotor vents, then discharge from the fan, and for a portion of that air to then flow axially through the yoke vents. However, due to the gap, the desired air flow might not be met because the gap created by the physical space between the end ring and the laminations, securement ring, and/or rotor core, can cause a portion of the air to return to the fan inlet and re-circulate. Due to the air re-circulation caused by the gap, less air might exit through the yoke vents to remove heat generated by the operation of the motor. As a result, the temperature in the motor might not be effectively and/or optimally decreased. If the temperature in the motor is not effectively and/or optimally decreased, the maximum horsepower of the motor can be limited. Also, the higher than ideal motor temperature can decrease the effective life of the motor and/or increase maintenance costs. Hence, there can be a need to manage, resist, and/or prevent the re-circulation of air that is caused by the gap, to increase the axial air flow through the motor, and/or to lower the operating temperature within the motor.

SUMMARY

Certain exemplary embodiments can comprise a system for managing air flow within an induction motor, such as in the rotor assembly of the motor. The system can comprise a gap blocker to substantially impede air flow through radial apertures defined by and/or near end regions of the rotor conductor bars.

BRIEF DESCRIPTION OF THE DRAWINGS

A wide variety of potential embodiments will be more readily understood through the following detailed description of certain exemplary embodiments, with reference to the accompanying exemplary drawings in which.

DEFINITIONS

Figure 1:
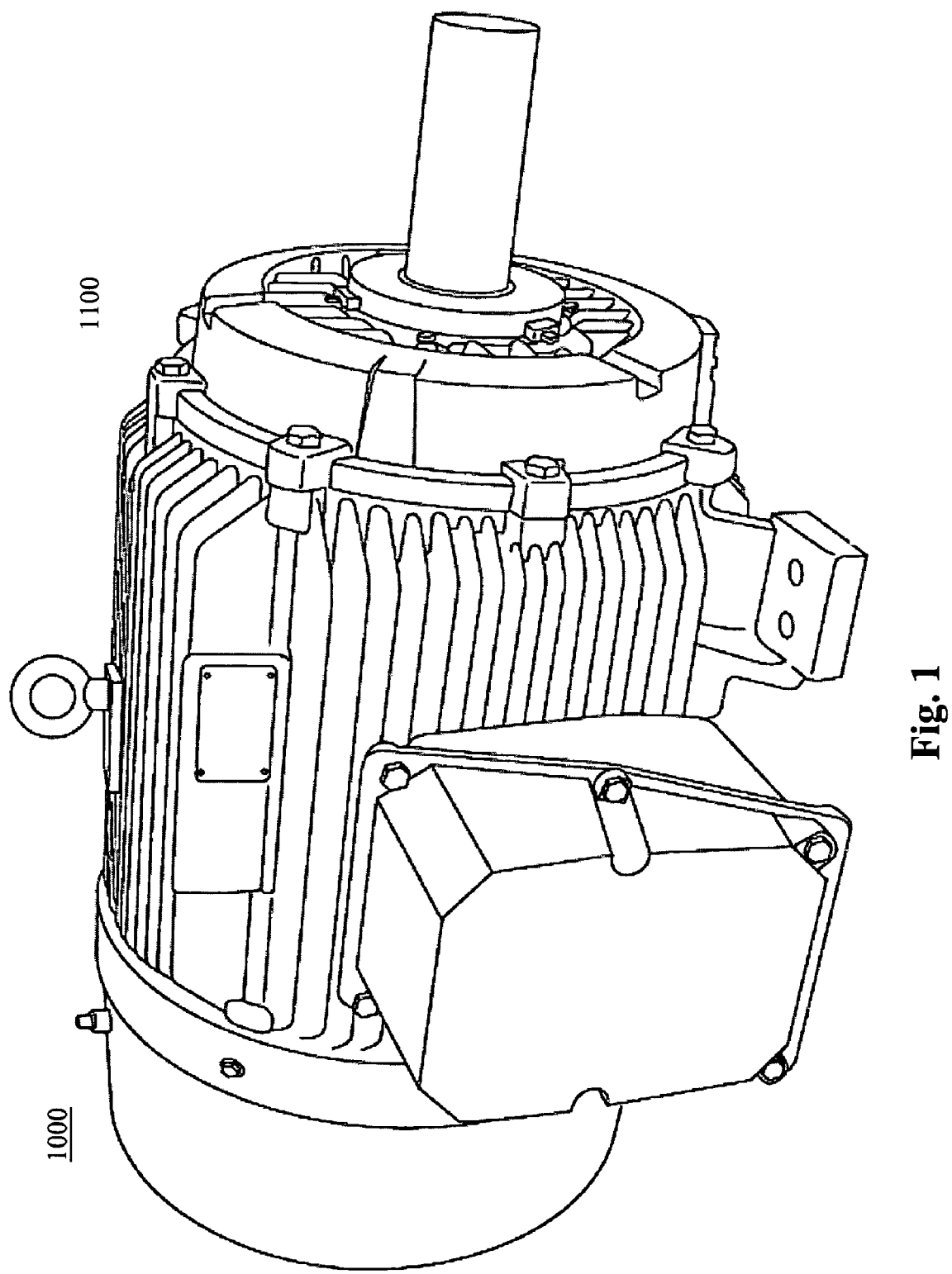
FIG. 1 is a perspective view of an exemplary embodiment of a system 1000.

When the following terms are used substantively herein, the accompanying definitions apply:

a—at least one.

above-NEMA motor—a motor that has a frame size larger than a NEMA frame size. These motors typically range in size from 200 to 10,000 horsepower.

activity—an action, act, step, and/or process or portion thereof.

adapted to—made suitable or fit for a specific use or situation.

adjacent—close to, near, next to, and/or adjoining.

air flow—a current of air.

alternating current (AC)—an electric current that reverses direction in a circuit at regular intervals.

and/or—either in conjunction with or in alternative to.

aperture—an opening, hole, gap, passage, and/or slit.

apparatus—an appliance or device for a particular purpose.

automatically—acting or operating in a manner essentially independent of external influence or control. For example, an automatic light switch can turn on upon "seeing" a person in its view, without the person manually operating the light switch.

axis—a straight line about which a body or geometric object rotates or can be conceived to rotate and/or a center line to which parts of a structure or body can be referred.

can—is capable of, in at least some embodiments.

circulate—to move in or flow through a circuit and/or to move about.

circulation—the movement and/or passage through a circuit, path, and/or system of conduits.

component—a constituent element and/or part.

comprising—including but not limited to.

concentric—having a common central axis.

conductor bar—a relatively long, relatively straight, and relatively rigid piece of solid material adapted to conduct an induced current.

configuration—an arrangement of parts and/or elements.

continuously—in a manner uninterrupted in time, sequence, substance, and/or extent.

core—a portion of a rotor comprising components in which a current is induced.

couple—to join, link, and/or connect.

cover—to overlay, place upon and/or over, and/or immerse.

cylindrical—of, relating to, and/or having the shape of a ring that has been extended parallel to the longitudinal axis of the rotor shaft.

define—to establish the outline, form, and/or structure of.

device—a machine, manufacture, and/or collection thereof.

direction—the spatial relation between something and the course along which it points or moves.

end—an extremity of something that has length.

end region—a portion of a conductor bar adapted to extend beyond laminations of the rotor core and comprising an extension and/or end of the conductor bar.

energize—to provide electricity to.

extending—existing, located, placed, and/or stretched lengthwise.

fan—a device for creating a flow of a vapor via the rotational movement of typically thin, rigid vanes.

frame—a supporting structure for the stator parts of an AC motor.

impede—to resist, retard, obstruct, hinder, and/or at least partially block.

induction motor—a type of alternating-current motor in which the primary winding on one member (usually the stator) is connected to the power source and a secondary winding or a squirrel-cage secondary winding on the other member (usually the rotor) carries the induced current. There is no physical electrical connection to the secondary winding, its current is induced.

lamination—a thin metallic sheet adapted to increase a resistance of a rotor core, thereby helping to avoid shorting the conductor bars, and to help transfer heat away from the conductor bars and/or rotor core.

locate—to place at a certain location.

longitudinal—of and/or relating to a length; placed and/or running lengthwise.

longitudinally opposed—placed at or near an opposite longitudinal end.

manage—to exert control or influence over, direct, and/or control the use of.

may—is allowed and/or permitted to, in at least some embodiments.

method—a process, procedure, and/or collection of related activities for accomplishing something.

motor—a device that converts electrical energy into mechanical energy to turn a shaft.

National Electrical Manufacturers Association (NEMA)—a non-profit standard-setting organization organized and supported by manufacturers of electric equipment and supplies.

operate—to perform a function and/or to work.

operative embodiment—an implementation that is in operation and/or is working as designed.

opposing—placed so as to be opposite something else.

plurality—the state of being plural and/or more than one.

pole—one of two or more regions in a magnetized body at which the magnetic flux density is concentrated.

portion—a part of whole.

predetermined—established in advance.

provide—to furnish, supply, and/or make available.

radially distributed plurality of apertures—a group of passages, each passage occurring along a radius emanating from the longitudinal axis of the shaft and extending from a region adjacent the rotor shaft to a region external to the rotor core, the group of radii evenly angularly-separated.

ring—a substantially toroidal object which can be imagined as having been generated by rotating a closed loop (e.g., ellipse, circle, irregular curve, polygon, etc.) about a fixed line external to the loop.

rotor assembly—the rotating member and/or armature of motor, which typically comprises a stacked plurality of laminations separating a plurality of conductor bars.

rotor core spacers—a plurality of structures adapted to separate the rotor core and/or the conductor bars from the rotor shaft.

separate—to space, set, or keep apart; to be positioned intermediate to.

set—a related plurality.

rotor shaft—a long, generally cylindrical bar that rotates and transmits power.

shaft-side opening—an entrance to or exit from an aperture, the opening facing and/or more proximal to the rotor shaft than an opposing opening of the aperture.

slot—a narrow opening and/or aperture.

stacked plurality—an orderly layered set of substantially identical objects.

stator—a portion of an AC induction motor that does not rotate.

stator coil—a substantially electrically conductive component of a stationary portion of a motor.

substantially—to a great extent or degree.

supply voltage—a provided electromotive force and/or potential difference.

surround—to encircle, enclose, and/or confine on several and/or all sides.

system—a collection of mechanisms, devices, data, and/or instructions, the collection designed to perform one or more specific functions.

via—by way of and/or utilizing.

DETAILED DESCRIPTION

Certain exemplary embodiments provide a system for managing air flow within an induction motor. The system can comprise a rotor assembly. The rotor assembly can comprise a rotor shaft defining a longitudinal axis; a plurality of longitudinally extending conductor bars, each of said conductor bars defining a first bar end region and a longitudinally opposed second bar end region; and/or a first end ring adapted to be positioned concentrically with said rotor shaft, to be coupled to said conductor bars, to electrically couple said conductor bars, and/or to substantially impede air flow through a first plurality of radial apertures defined by said plurality of first bar end regions.

FIG. 1 is a perspective view of an exemplary embodiment of a system 1000, which can comprise an alternating current induction motor 1100, such as a NEMA motor and/or an above-NEMA motor.

Figure 2:
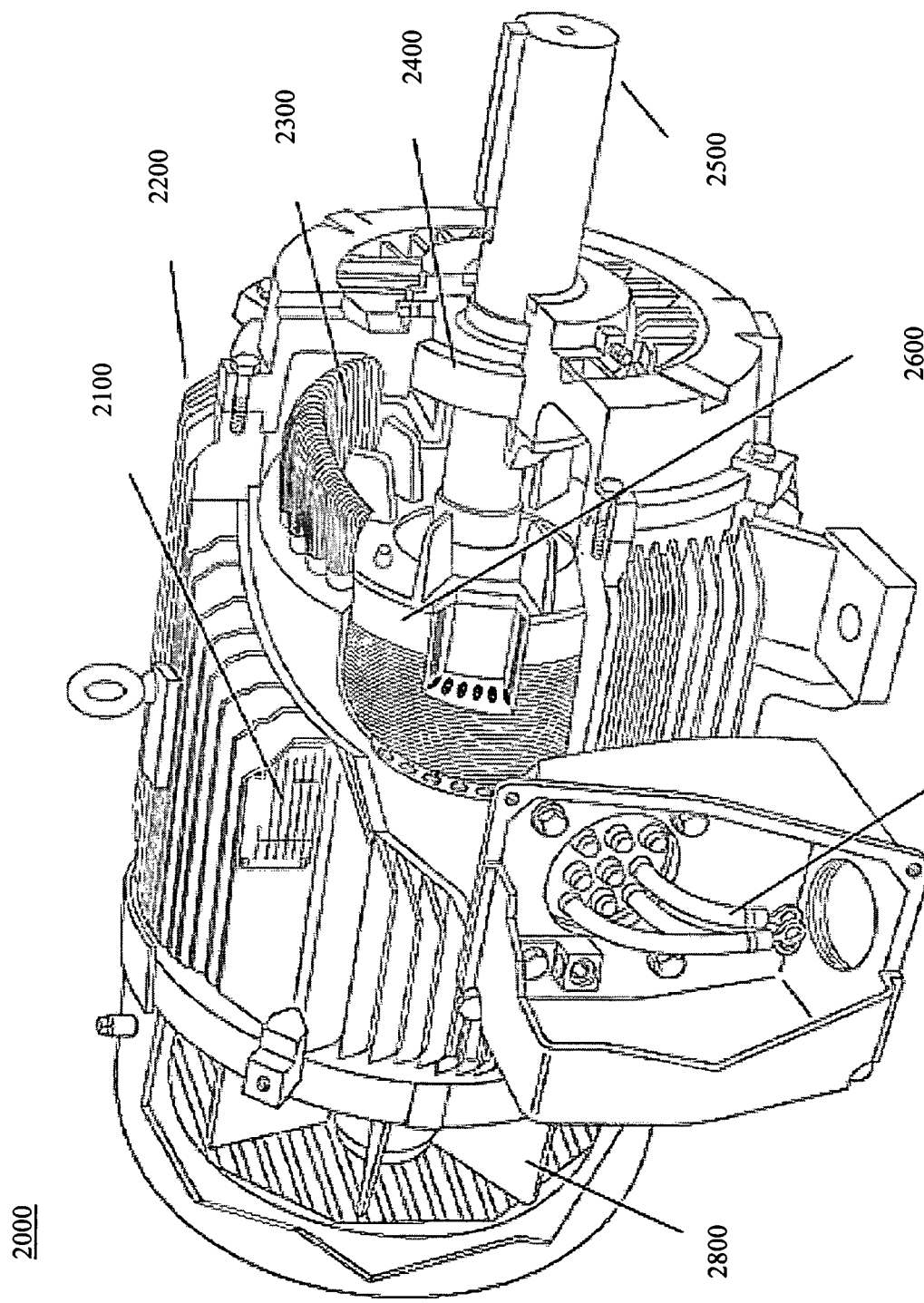
FIG. 2 is a perspective view of an exemplary embodiment of a system 2000.

FIG. 2 is a cut-away perspective view of an exemplary embodiment of a system 2000, which can comprise an alternating current induction motor 2100, which can comprise a nameplate 2100 that identifies certain characteristics of the motor, frame 2200, stator 2300, bearing 2400, shaft 2500, rotor assembly 2600, supplied electrical power cables 2700, and/or fan 2800.

Figure 3:
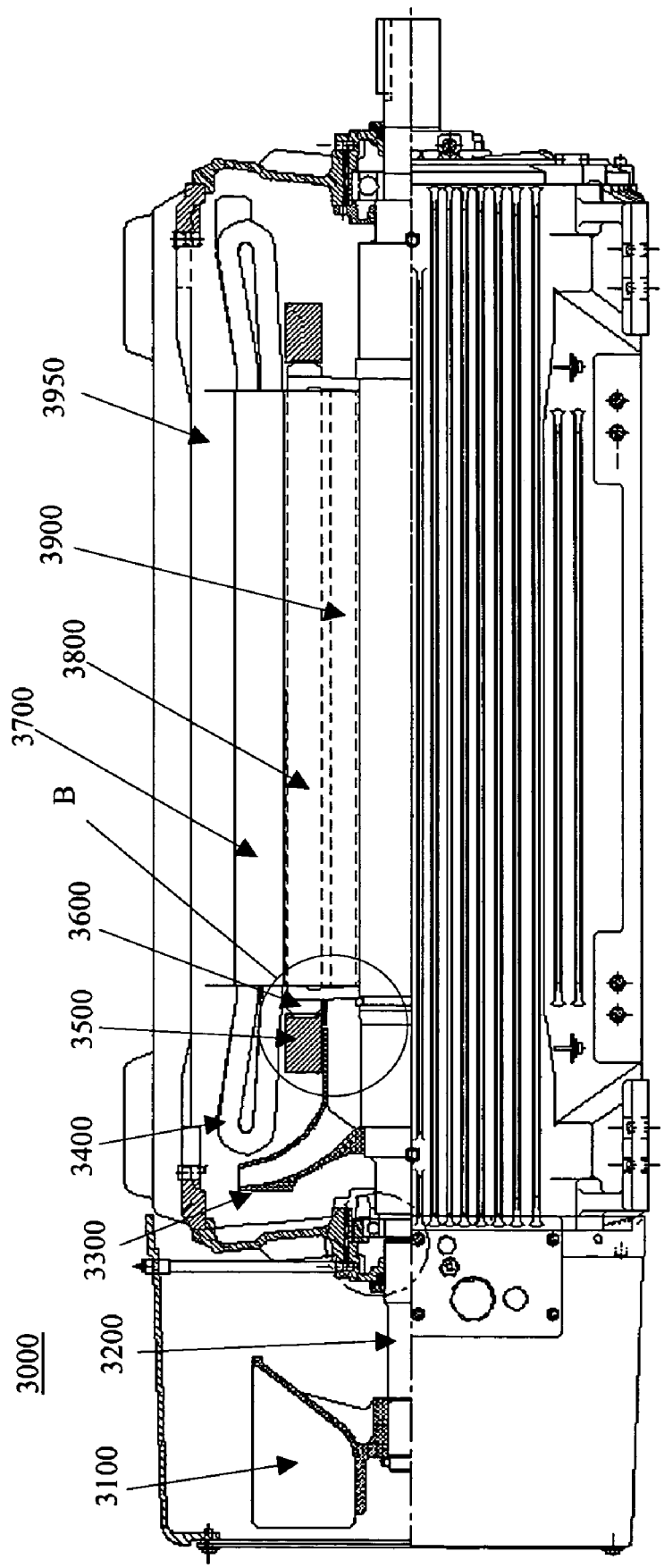
FIG. 3 is a cross-sectional view of an exemplary embodiment of a system 3000.

FIG. 3 is a cross-sectional view of an exemplary embodiment of a system 3000, which can comprise external fan 3100, rotor shaft 3200, internal fan 3300, stator windings or coils 3400, end ring 3500, end extension and/or end region 3600, stator core 3700, rotor core 3800, shaft-side rotor air vent, passage, and/or channel 3900, and/or yoke axial vent and/or stator-side air vent, passage, and/or channel 3950.

Figure 4:
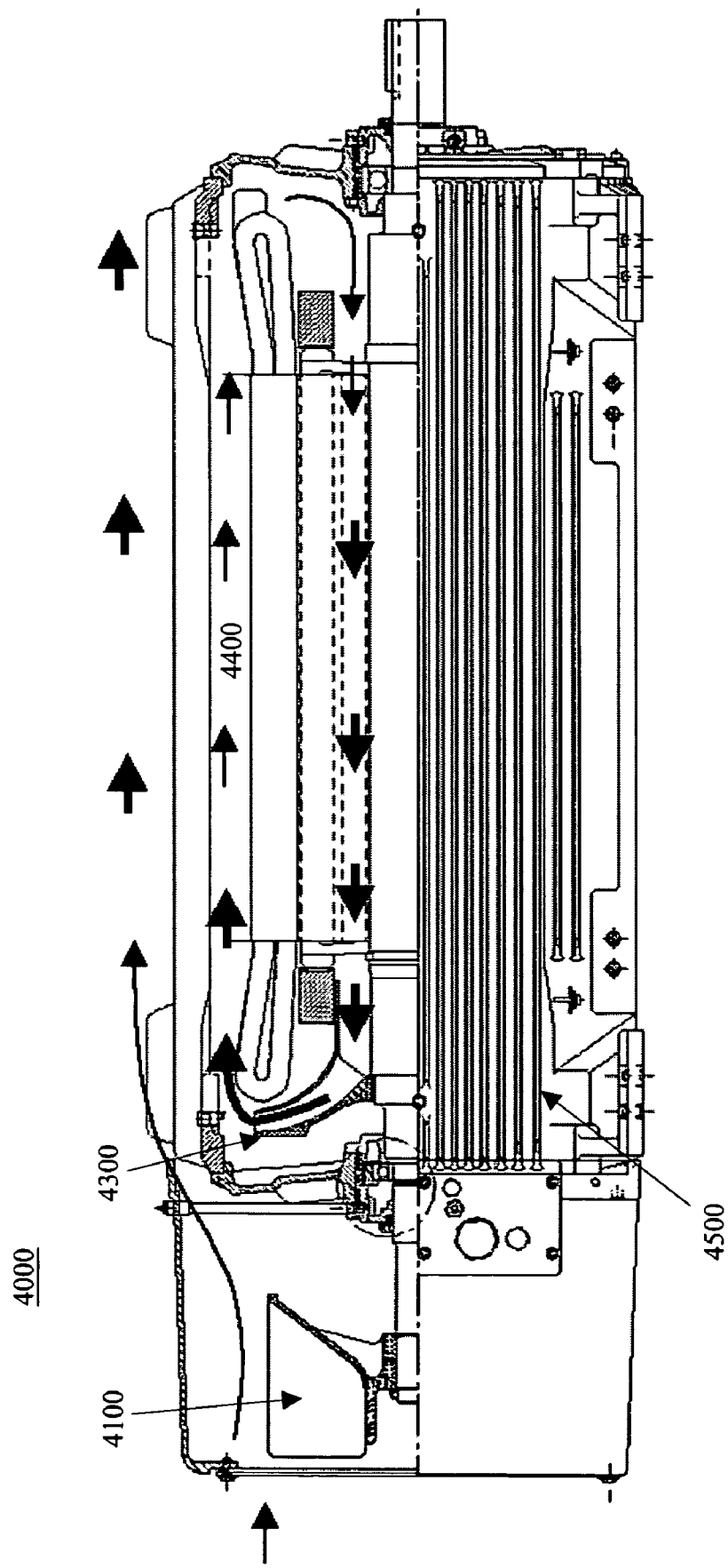
FIG. 4 is a schematic of air flow in an exemplary embodiment of a system 4000.

FIG. 4 is a schematic of air flow in an exemplary embodiment of a system 4000. External fan 4100 can create and/or maintain a desired external air flow 4200, which can circulate external to a frame 4500 and/or enclosure of the motor. Internal fan 4300 can create and/or maintain a desired internal air flow 4400, which can circulate within the frame of the motor. In each air flow, cooler air is denoted by flow lines having a thinner line weight or thickness, and warmer air is denoted by flow lines having a thicker line weight or thickness.

Figure 5:
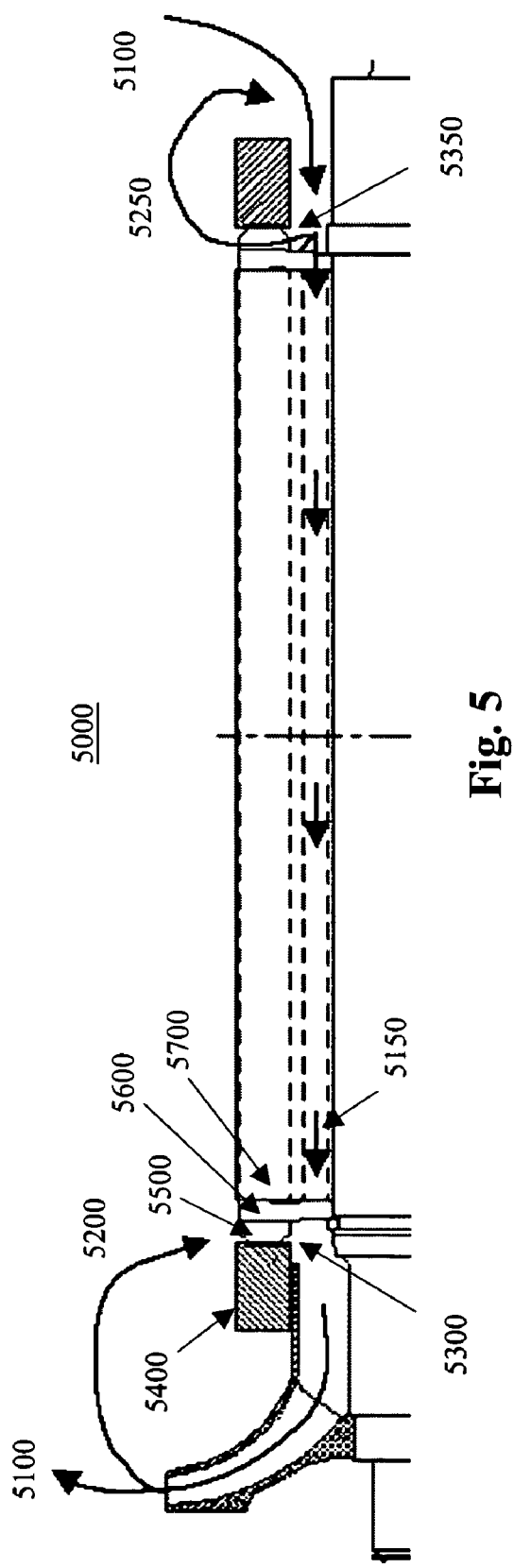
FIG. 5 is a schematic of air flow in an exemplary embodiment of a system 5000.

FIG. 5 is a schematic of air flow in an exemplary embodiment of a known system 5000, showing how the internal air flow can comprise a stator-side or yoke flow component 5100, a shaft-side flow component 5150, a warmed air re-circulating flow component 5200, and/or a cooled air re-circulating flow component 5250. Warmed air re-circulating flow component 5200 can flow through a stator-side opening of, and through, aperture and/or gap 5300 defined between end ring 5400 and: conductor bar end region 5500, securement ring 5600, and/or rotor core 5700. Cooled air re-circulating flow component 5250 can flow through a shaft-side opening of, and through, a substantially similar aperture and/or gap 5350.

Figure 6:
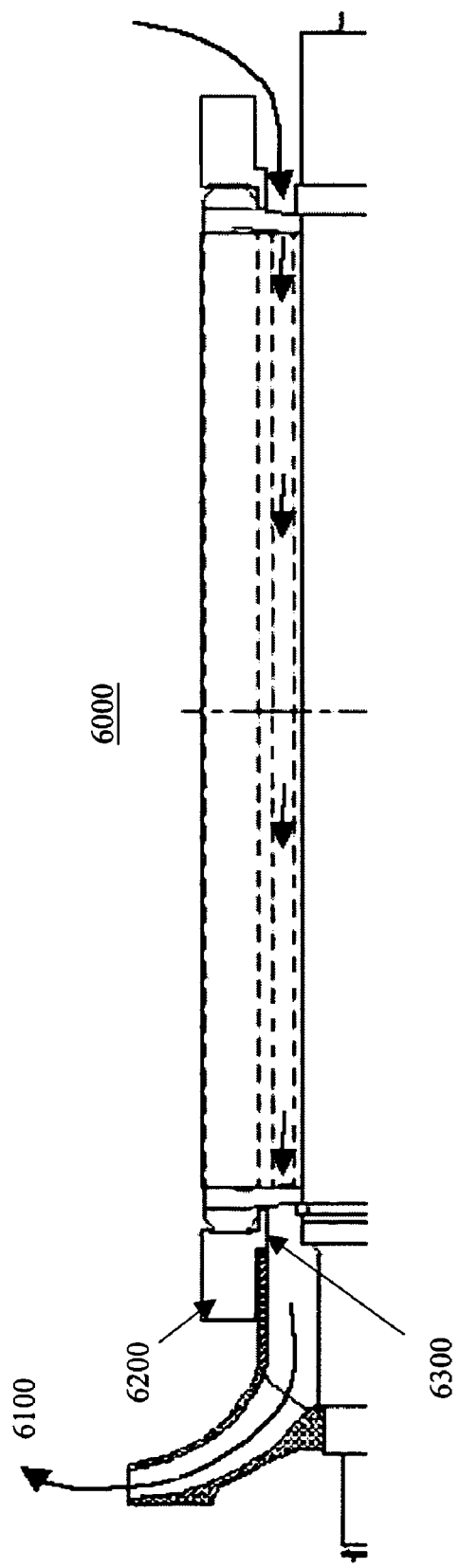
FIG. 6 is a schematic of air flow in an exemplary embodiment of a system 6000.

FIG. 6 is a schematic of air flow in an exemplary embodiment of a system 6000, showing how the internal air flow can be comprised exclusively, substantially completely, and/or nearly completely of a desired, shaft-side, and/or shaft-to-yoke flow component 6100 and/or can substantially lack an undesired and/or re-circulating component when end ring 6200 comprises a gap blocker 6300 configured to substantially block the gap, thereby substantially impeding the corresponding re-circulating flow component. By impeding the re-circulating air flow, the motor can decrease idle losses, decrease the rotor core temperature, and/or achieve cooling that is closer to optimal, which can increase the maximum horsepower, increase the efficiency, increase the life, and/or decrease the maintenance costs, of the motor.

Figure 7:
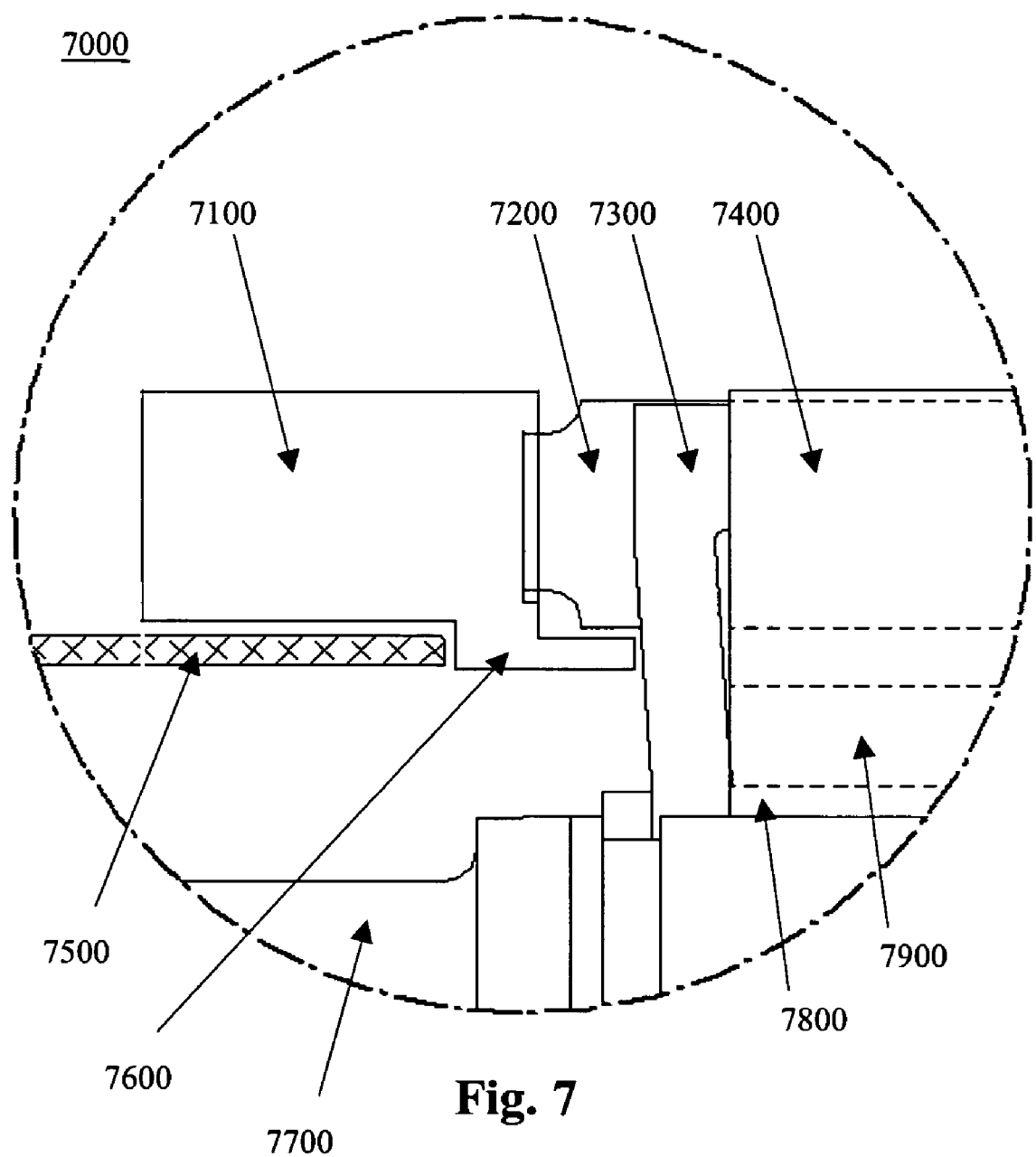
FIG. 7 is a detail view of an exemplary embodiment of a system 7000.

FIG. 7 is a detail view of an exemplary embodiment of a system 7000, taken at detail B of FIG. 3. System 7000 can comprise an end ring 7100; conductor bar end region(s) 7200; rotor core tooth support and/or securement ring 7300; rotor core 7400; internal fan 7500; gap blocker 7600; shaft 7700; rotor core spacer(s) 7800; and/or shaft-side rotor axial air vent(s), passage(s), and/or channel(s) 7900. A substantially mirror-image configuration of system 7000 can be located on an opposite end of rotor core 7400, possibly without fan 7500.

End ring 7100 can have a substantially rectangular cross-section. Gap blocker 7600 can have a substantially rectangular and/or L-shaped cross section, which can be integral to, contiguous with, and/or attached to a cross-sectional corner of end ring 7100. Thus, end ring 7100 can be visualized as a cylinder and gap blocker 7600 can also be visualized as a somewhat smaller diameter cylinder and/or cylindrical portion integral to and/or attached to end ring 7100. If integral, the end ring 7100 and gap blocker 7600 can form a unitary, monolithic structure. In an alternative embodiment (not shown), gap blocker 7600 can be located stator-side and/or can have an inner diameter equal to or larger than an outer diameter of end ring 7100. In an alternative embodiment (not shown), gap blocker 7600 can be integral to and/or attached to securement ring 7300.

As shown, in certain exemplary embodiments, gap blocker 7600 can substantially block and/or cover some or all of the radial apertures (and/or a shaft-side opening thereof) defined by the gaps between conductor bar end regions 7200 and between securement ring 7300 and fan 7500 and/or end ring 7100.

Figure 8:
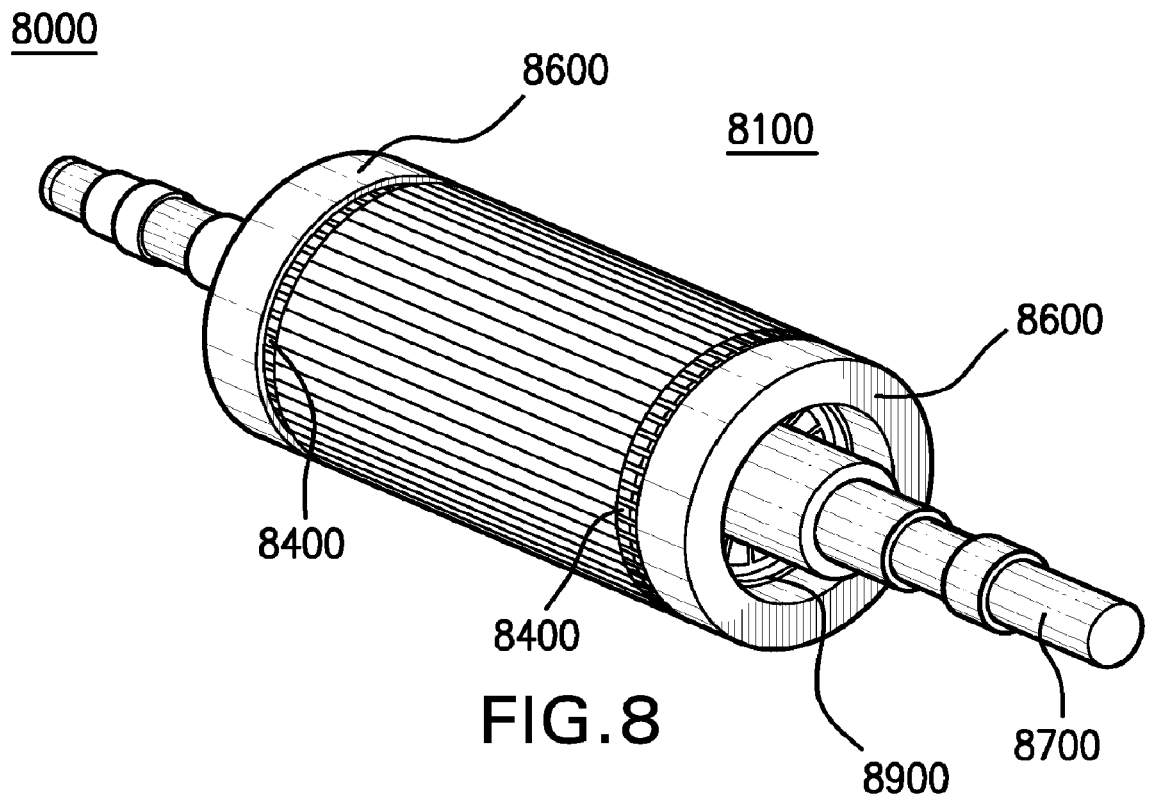
FIG. 8 is a perspective view of an exemplary embodiment of a system 8000.
Figure 9:
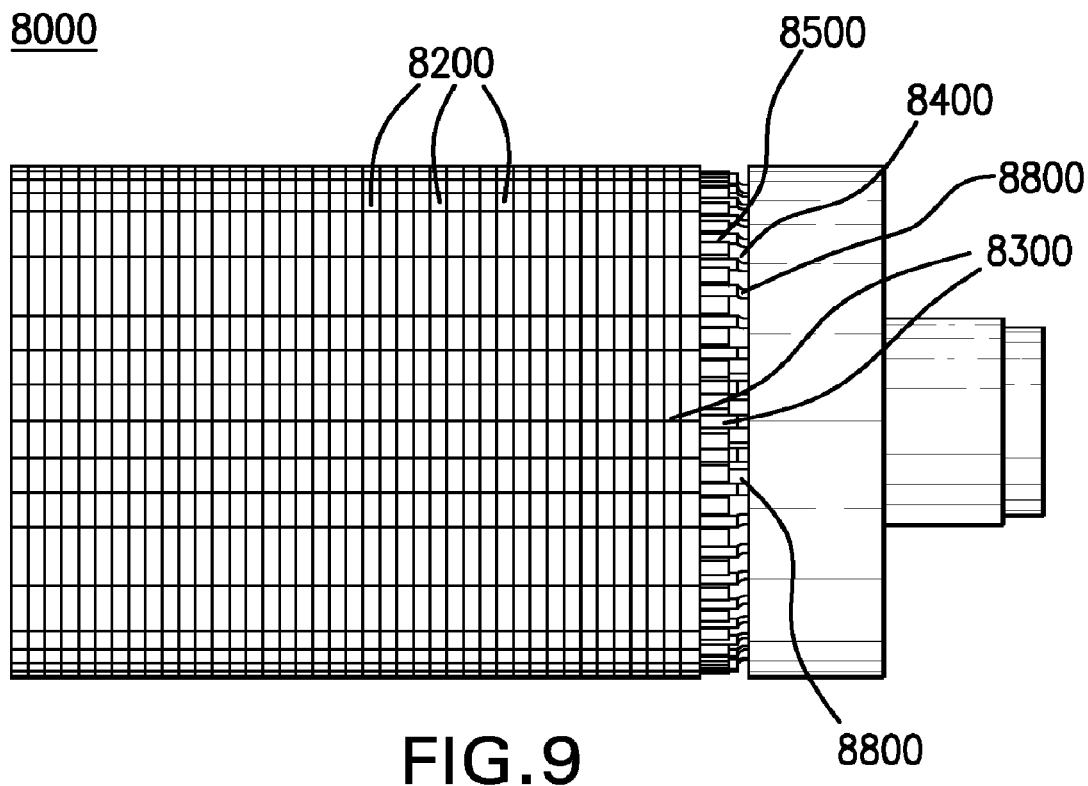
FIG. 9 is a side view of an exemplary embodiment of a system 9000.

FIG. 8 is a perspective view, and FIG. 9 is a side view of an exemplary embodiment of a system 8000, which can comprise rotor assembly 8100, which can comprise a stacked plurality of laminations 8200; a set of radially distributed rotor conductor bars 8300, each defining a pair of opposing bar end regions 8400; a securement ring 8500; an end ring 8600; and a shaft 8700. Note that although a stator-side opening 8800 to the gap is visible, the rotor-side opening to the gap is substantially blocked by gap blocker 8900, which can be integral to and/or a portion of, end ring 8600. Conductor bars 8300 and/or end rings 8600 can be comprised of copper.

Figure 10:
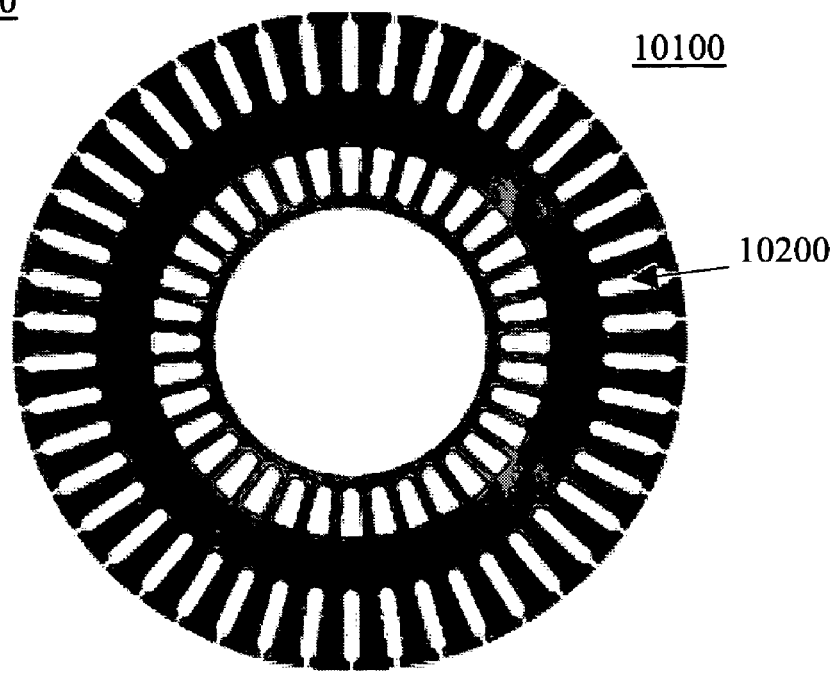
FIG. 10 is a side view of an exemplary embodiment of a system 10000.

FIG. 10 is a side view of an exemplary embodiment of a system 10000, which can comprise a rotor lamination 10100, which can comprise slots 10200 to accommodate conductor bars.

Figure 11:
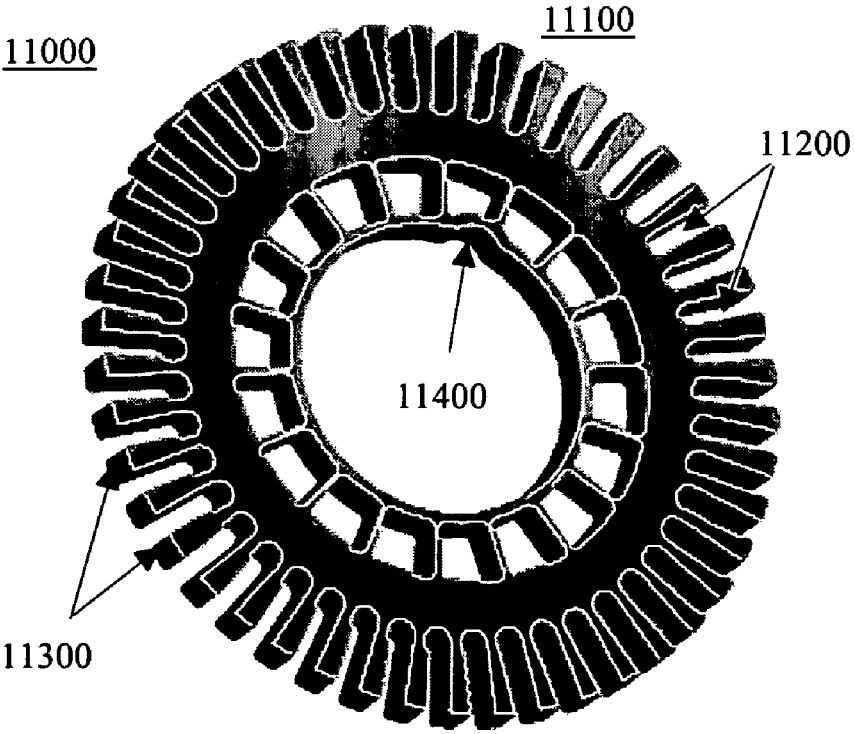
FIG. 11 is a perspective view of an exemplary embodiment of a system 11000.

FIG. 11 is a perspective view of an exemplary embodiment of a system 11000, which can comprise a securement ring 11100, which can be used to compress, secure, and/or support a stacked plurality of rotor laminations. Securement ring 11100 can comprise a radially distributed plurality of slots 11200 that can accommodate the conductor bars, and a plurality of teeth 11300 that can straddle, separate, and/or provide space apart each rotor conductor bar. Securement ring 11100 can comprise a keyway 11400 that can accommodate a key that can locks securement ring 11100 to the rotor shaft.

Figure 12:
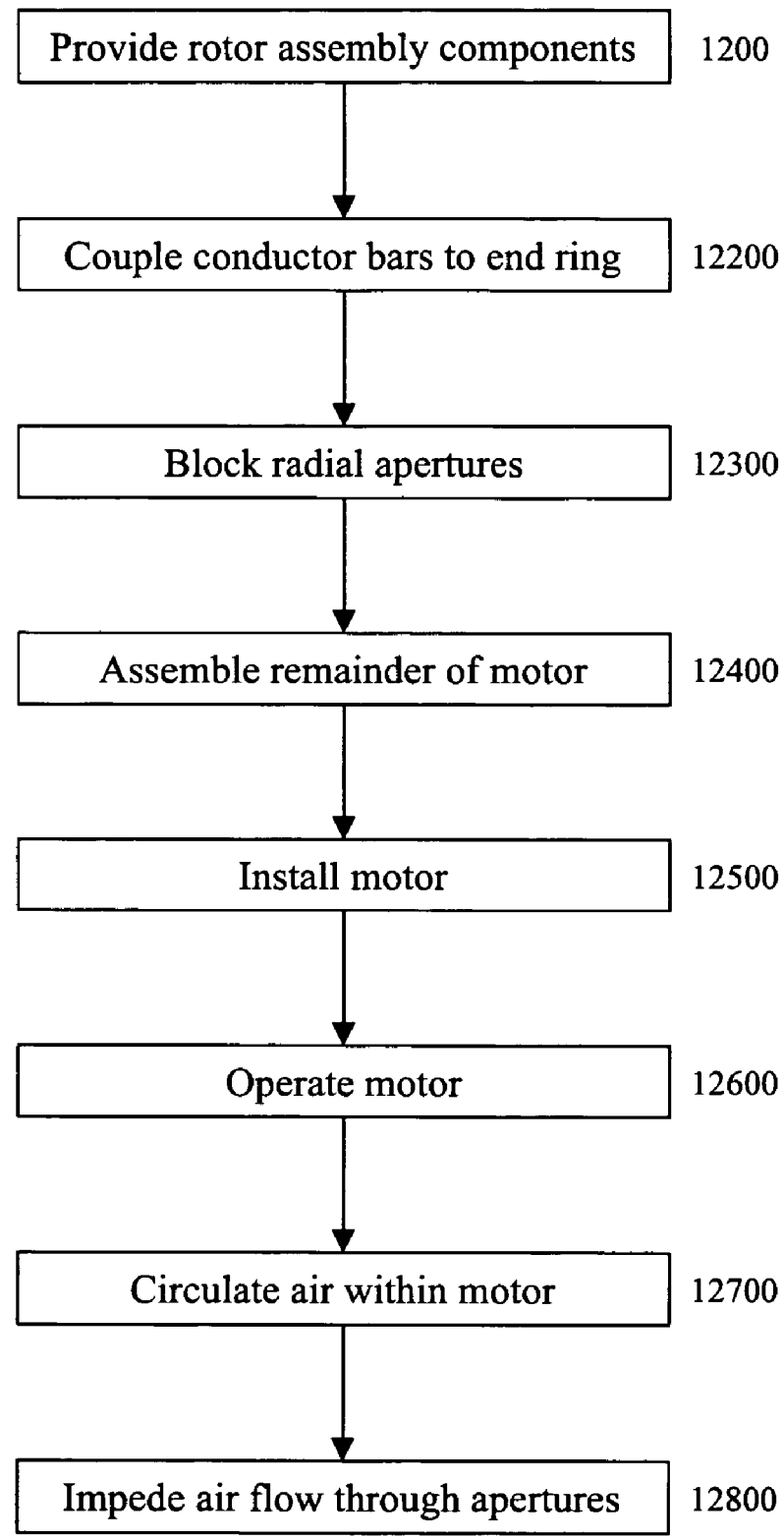
FIG. 12 is a flowchart of an exemplary embodiment of a method 12000.

FIG. 12 is a flowchart of an exemplary embodiment of a method 12000. At activity 12100, a rotor core, a stacked plurality of laminations, a securement ring, conductor bars, and/or an end ring can be provided and/or assembled such that a plurality of radial apertures and/or blocked radial apertures are defined by the securement ring, end regions of the conductor bars, and/or the end ring. At activity 12200, ends of the conductor bars can be coupled to the end ring, such as via brazing and/or an inductive heating process. At activity 12300, the radial apertures can be blocked by a gap blocker integral to the end ring and/or integral to the securement ring. At activity 12400, the remainder of the motor can be assembled. At activity 12500, the motor can be installed. At activity 12600, the motor can be operated. At activity 12700, air can be circulated within the motor. At activity 12800, air flow through the radial apertures can be substantially impeded. By impeding air flow through the radial apertures, the motor can achieve cooling that is closer to optimal, which can raise the maximum horsepower, increase the life, and/or decrease the maintenance costs, of the motor.

An exemplary implementation demonstrated some of these benefits, as is shown in Table 1, below.

TABLE 1

Performance characteristics of open vs. covered gap

| | | | |
|---|---|---|---|
| Order No.: | D02004-03 | | |
| Frame/Type: | 5013/CZ Cu Sleeve Bearing | | |
| Rating: | 800 HP, 2300/4000 V, 4 Pole | | |
| Motor Condition: | Test | Test | |
| Gap eliminated? | No | Yes | |
| Test Date: | Feb. 16, 2003 | Jul. 26, 2003 | |
| Test HP: | 821.236 | 829 | Power at which the test was run |
| Rotor Type: | Cu | Cu | Type of rotor |
| RPM, full load: | 1791 | 1791 | Tested RPM (speed of motor) |
| W&F, KW: | 5.11 | 4.6 | Tested idle losses. The losses were reduced because of less recirculation |
| Efficiency 4/4: | 95.4 | 95.6 | |
| Power Factor 4/4: | 82.7 | 82.8 | |
| Temp R/Res: | 75.1 | 65.9 | Tested temperature rise of motor. |
| NDE R/RTD: | 39.3 | 33.3 | Tested temp. rise of non drive end bearing |

TABLE 1-continued

Performance characteristics of open vs. covered gap

| | | | |
|---|---|---|---|
| DE R/RTD: | 48 | 41.7 | Tested temp rise of drive end bearing |
| Rotor Temp Total(Cal): | 117 | 99 | Calculated temperature of the rotor. |

As can be seen from Table 1, when the gap was substantially eliminated, reduced, and/or blocked, the decrease in re-circulation caused substantially:

- lower idle losses, which can be comprised of bearing and fan losses;
- lower actual temperature rise of the motor, thereby allowing more power to be generated within the insulation class limits;
- lower actual temperature rise of the non-driven end bearing and/or the driven end bearing, thereby increasing the life of the bearings and/or lubricating oil;
- lower calculated rotor temperature rise;
- greater full load efficiency (ratio of input power to output power); and/or
- greater motor horsepower.

In another exemplary embodiment, by utilizing the gap blocker as described herein, a 2 pole motor occupying a NEMA 580 frame and utilizing an 11,000 volt stator supply voltage was designed and successfully tested. This motor utilized several rotor core spacers extending longitudinally along and welded to the rotor shaft to create the shaft-side air channels and/or rotor vents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, such as via an explicit definition, there is no requirement for the inclusion in any claim herein (or of any claim of any application claiming priority hereto) of any particular described or illustrated characteristic, function, activity, or element, any particular sequence of activities, or any particular interrelationship of elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A system for managing air flow within an induction motor, comprising:
    a rotor assembly comprising:
        a rotor shaft defining a longitudinal axis;
        a plurality of longitudinally extending conductor bars, each of said conductor bars defining a first bar end region and a longitudinally opposed second bar end region; and
        a first end ring adapted to be positioned concentrically with said rotor shaft, to be coupled to said conductor bars, to electrically couple said conductor bars, and to substantially impede air flow through a first plurality of radial apertures defined by said plurality of first bar end regions, said first end ring contiguous with a gap blocker, said gap blocker having a substantially L-shaped cross section, said gap blocker adapted to substantially cover radial apertures defined by gaps between conductor bar end regions and a fan of said induction motor, said gap blocker adapted to be positioned to substantially block a gap defined by said fan and a securement ring, said securement ring adapted to secure a stacked plurality of rotor laminations comprised by of said induction motor.

2. The system of claim 1, wherein said first end ring is adapted to substantially cover said first plurality of radial apertures.

3. The system of claim 1, wherein said first end ring comprises a cylindrical portion adapted to substantially cover said first plurality of radial apertures.

4. The system of claim 1, wherein said first end ring comprises a cylindrical portion adapted to substantially cover a shaft-side opening of each of said first plurality of radial apertures.

5. The system of claim 1, wherein said first plurality of radial apertures is defined between said first end ring and said securement ring, said securement ring located substantially adjacent a stacked plurality of laminations comprised by said rotor assembly.

6. The system of claim 1, wherein said plurality of second bar end regions define a second plurality of radial apertures.

7. The system of claim 1, further comprising a second end ring adapted to be coupled to each of said conductor bars.

8. The system of claim 1, further comprising a second end ring adapted to be coupled to said second bar end region of each of said conductor bars.

9. The system of claim 1, further comprising a second end ring adapted to substantially impede air flow through a second plurality of radial apertures defined by said plurality of second bar end regions.

10. The system of claim 1, further comprising a second end ring adapted to substantially impede air flow through a second plurality of radial apertures defined by said plurality of second bar end regions, said second end ring comprising a cylindrical portion adapted to substantially cover said second plurality of radial apertures.

11. The system of claim 1, further comprising a second end ring adapted to substantially impede air flow through a second plurality of radial apertures defined by said plurality of second bar end regions, said second end ring comprising a cylindrical portion adapted to substantially cover a shaft-side opening of each of said second plurality of radial apertures.

12. The system of claim 1, wherein said first end ring is adapted to be coupled to each of said conductor bars.

13. The system of claim 1, wherein said first end ring is adapted to be coupled to said first bar end region of each of said conductor bars.

14. The system of claim 1, wherein said securement ring is coupled to said shaft and defines a plurality of slots, each of said plurality of first bar end regions adapted to extend through a corresponding slot from the plurality of slots.

15. The system of claim 1, wherein said securement ring defines a plurality of radially distributed slots adapted to separate said plurality of first bar end regions.

16. The system of claim 1, wherein said securement ring is located adjacent a stacked plurality of laminations comprised by said rotor assembly and coupled to said shaft, said securement ring defining a plurality of radially distributed slots, each of said plurality of first bar end regions adapted to extend through a corresponding slot from the plurality of radially distributed slots.

17. The system of claim 1, further comprising a plurality of rotor core spacers adapted to extend longitudinally along said shaft.

18. The system of claim 1, further comprising a plurality of rotor core spacers extending longitudinally along and welded to said shaft.

19. The system of claim 1, further comprising said fan coupled to said shaft.

20. The system of claim 1, further comprising a stacked plurality of laminations comprised by said rotor assembly.

21. The system of claim 1, further comprising a plurality of stator coils that define only two poles.

22. The system of claim 1, further comprising:
a stator; and
a 580 NEMA frame adapted to surround at least a portion of said stator, said stator adapted to be energized by a supply voltage of approximately 11,000 volts.

23. A method for managing air flow within an induction motor, comprising:
providing a rotor assembly comprising:
a rotor shaft defining a longitudinal axis;
a plurality of longitudinally extending conductor bars, each of said conductor bars defining a first bar end region and a longitudinally opposed second bar end region; and
coupling to said conductor bars a first end ring adapted to be positioned concentrically with said rotor shaft, to electrically couple said conductor bars, and to substantially impede air flow through a first plurality of radial apertures defined by said plurality of first bar end regions, said first end ring contiguous with a gap blocker, said gap blocker having a substantially L-shaped cross section, said gap blocker adapted to substantially cover radial apertures defined by gaps between conductor bar end regions and a fan of said induction motor, said gap blocker adapted to be positioned to substantially block a gap defined by said fan and a securement ring, said securement ring adapted to secure a stacked plurality of rotor laminations comprised by of said induction motor.

24. The system of claim 1, wherein:
said securement ring is locked to said rotor shaft via a key in a keyway.

* * * * *